(12) United States Patent
Chiang et al.

(10) Patent No.: US 9,400,914 B2
(45) Date of Patent: Jul. 26, 2016

(54) METHOD AND ELECTRONIC DEVICE FOR GENERATING FINGERPRINT ENROLLMENT DATA

(71) Applicant: Egis Technology Inc., Taipei (TW)

(72) Inventors: Yuan-Lin Chiang, Taipei (TW); Yu-Chun Cheng, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 14/791,174

(22) Filed: Jul. 2, 2015

(65) Prior Publication Data

US 2016/0117545 A1    Apr. 28, 2016

Related U.S. Application Data

(60) Provisional application No. 62/068,035, filed on Oct. 24, 2014.

(30) Foreign Application Priority Data

Mar. 5, 2015    (CN) .......................... 2015 1 0097901

(51) Int. Cl.
  *G06K 9/00* (2006.01)
(52) U.S. Cl.
  CPC ........ *G06K 9/00087* (2013.01); *G06K 9/00013* (2013.01)

(58) Field of Classification Search
  None
  See application file for complete search history.

(56) References Cited

U.S. PATENT DOCUMENTS 6,941,001 B1    9/2005  Bolle et al.
7,236,617 B1 *  6/2007  Yau ................... G06K 9/00026
                                                    382/125

(Continued)

FOREIGN PATENT DOCUMENTS

CN    101980244 A    2/2011
TW    200411572      7/2004

(Continued)

*Primary Examiner* — Randolph I Chu

(57) ABSTRACT

A method and electronic device for generating fingerprint enrollment data are provided. The method includes the steps of capturing first input data, wherein the first input data is divided into a plurality of first blocks and each of the first blocks has an index value; capturing second input data, wherein the second input data is divided into a plurality of second blocks and each of the second blocks has the index value; comparing and combining the first input data with the second input data to generate a comparison result; accumulating the index values of the first blocks and the second blocks in an area of overlapping between the first input data and second input data; and generating prompting information according to the comparison result.

16 Claims, 4 Drawing Sheets

(56) References Cited

U.S. PATENT DOCUMENTS

| | | | |
|---|---|---|---|
| 8,421,890 B2* | 4/2013 | Benkley, III | G06K 9/0002 348/294 |
| 2003/0002720 A1* | 1/2003 | Wada | G06K 9/00087 382/124 |
| 2005/0129291 A1* | 6/2005 | Boshra | G06K 9/00026 382/124 |
| 2005/0147282 A1* | 7/2005 | Fujii | G06K 9/00087 382/124 |
| 2005/0175225 A1* | 8/2005 | Shinzaki | G06K 9/00087 382/124 |
| 2005/0185828 A1* | 8/2005 | Semba | G06K 9/00006 382/124 |
| 2005/0238212 A1* | 10/2005 | Du | G06K 9/00026 382/124 |
| 2006/0002596 A1* | 1/2006 | Takahashi | G06K 9/00026 382/124 |
| 2007/0253605 A1* | 11/2007 | Maurer | G06K 9/00067 382/124 |
| 2009/0052752 A1* | 2/2009 | Monden | G06K 9/036 382/124 |
| 2010/0046810 A1* | 2/2010 | Yamada | G06K 9/00067 382/124 |
| 2010/0266169 A1* | 10/2010 | Abiko | G06K 9/00026 382/124 |
| 2010/0332487 A1* | 12/2010 | Monden | G06K 9/00087 707/758 |
| 2011/0286640 A1* | 11/2011 | Kwon | G06K 9/00026 382/124 |
| 2011/0286686 A1* | 11/2011 | Kwon | G06K 9/00026 382/294 |
| 2012/0090015 A1* | 4/2012 | Abe | G06F 21/32 726/2 |
| 2013/0272586 A1* | 10/2013 | Russo | G06K 9/00087 382/124 |
| 2014/0003677 A1* | 1/2014 | Han | G06K 9/00006 382/124 |
| 2014/0003678 A1* | 1/2014 | Vieta | G06K 9/00026 382/124 |
| 2014/0003681 A1* | 1/2014 | Wright | G06K 9/00013 382/124 |
| 2014/0212010 A1 | 7/2014 | Han et al. | |
| 2015/0074615 A1* | 3/2015 | Han | G06K 9/00033 715/863 |
| 2015/0278574 A1* | 10/2015 | Boshra | G06K 9/00013 382/125 |
| 2015/0286855 A1* | 10/2015 | Neskovic | G06K 9/00073 382/125 |
| 2015/0294131 A1* | 10/2015 | Neskovic | G06K 9/00026 382/125 |
| 2015/0324569 A1* | 11/2015 | Hong | G06F 21/32 345/174 |

FOREIGN PATENT DOCUMENTS

| | | |
|---|---|---|
| TW | I225223 | 12/2004 |
| TW | 200745970 | 12/2007 |

* cited by examiner

METHOD AND ELECTRONIC DEVICE FOR GENERATING FINGERPRINT ENROLLMENT DATA

CROSS REFERENCE TO RELATED APPLICATIONS

This Application claims priority of Provisional Patent Application No. 62/068,035 filed on Oct. 24, 2014, and CN Patent Application No. 201510097901.1 filed on Mar. 5, 2015, the entirety of which is incorporated by reference herein.

BACKGROUND OF THE INVENTION

1. Field of the Invention

The invention generally relates to fingerprint enrollment data generating technology, and more particularly, to the fingerprint enrollment data generating technology for informing the user to move his or her finger according to the prompting information.

2. Description of the Related Art

In recent years, biometric recognition technology has developed greatly. Since security codes and access cards may easily be stolen or lost, more attention has been paid to fingerprint-recognition technology. Fingerprints are unique and never-changing, and each person has multiple fingers for identity recognition. In addition, fingerprints can be obtained easily by using fingerprint sensors. Therefore, fingerprint recognition can provide increased security and convenience, and financial security and confidential data can have better protection.

With conventional fingerprint recognition technology, the user presses his or her finger on the fingerprint sensor or swipes his or her finger over the fingerprint sensor in order to generate the fingerprint data. However, using a fingerprint sensor with a small sensing area, in order to obtain sufficient fingerprint enrollment data for recognition, the user needs to press his or her finger on the fingerprint sensor several times so as to establish the fingerprint enrollment data. In addition, when establishing the fingerprint enrollment data, the user must put his or her finger on a specific area of the fingerprint sensor. The verifying fingerprint will fail to be verified because the coverage of the fingerprint enrollment data is too small.

Therefore, when establishing the fingerprint enrollment data, how to indicate to the user how and where to move his or her finger is a subject worthy of discussion.

BRIEF SUMMARY OF THE INVENTION

A method and electronic device for generating fingerprint enrollment data are provided to generate the fingerprint enrollment data by indicating to the user where and how the user should move his or her finger according to the prompting information.

An embodiment of the invention provides a method for generating fingerprint enrollment data. The method comprises the steps of capturing first input data, wherein the first input data is divided into a plurality of first blocks and each of the first blocks has an index value; capturing second input data, wherein the second input data is divided into a plurality of second blocks and each of the second blocks has an index value; comparing and combining the first input data with the second input data to generate a comparison result; accumulating the index values of the first blocks and the second blocks in an area of overlapping between the first input data and second input data; and generating prompting information according to the comparison result.

An embodiment of the invention provides an electronic device. The electronic device comprises a fingerprint sensor and a processing unit. The fingerprint sensor is configured to capture first input data, wherein the first input data is divided into a plurality of first blocks and each of the first blocks has an index value and captures second input data, wherein the second input data is divided into a plurality of second blocks and each of the second blocks has an index value. The processing unit is configured to compare and combine the first input data with the second input data to generate a comparison result, and generate prompting information according to the comparison result, wherein when generating a comparison result, the processing unit accumulates the index values of the first blocks and the second blocks in an area of overlapping between the first input data and second input data.

Other aspects and features of the invention will become apparent to those with ordinary skill in the art upon review of the following descriptions of specific embodiments of methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
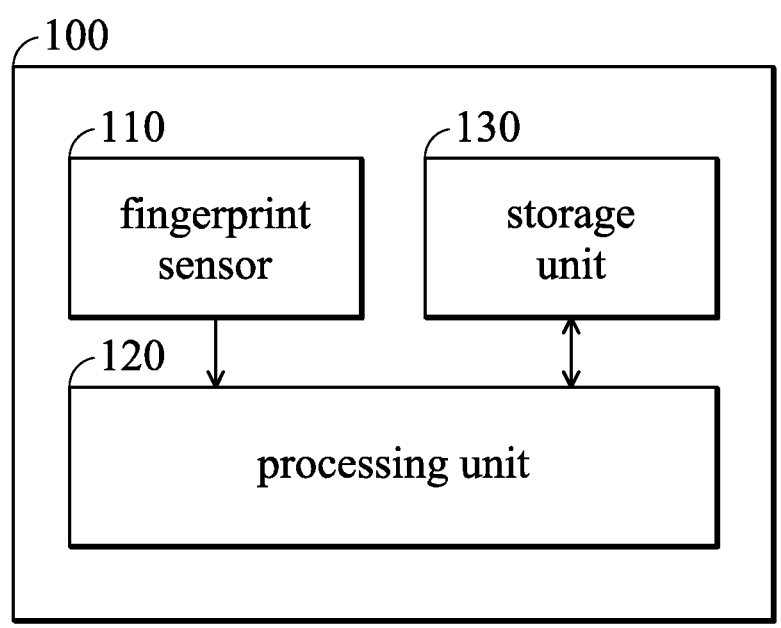
FIG. 1 is a block diagram of an electronic device 100 according to an embodiment of the invention.

FIG. 1 is a block diagram of an electronic device 100 according to an embodiment of the invention. In an embodiment of the invention, the electronic device 100 is an electronic device with a fingerprint recognition function, e.g. a mobile phone, a smartphone, a tablet computer, a note book, and so on. As shown in FIG. 1, the electronic device 100 comprises a fingerprint sensor 110, a processing unit 120 and a storage unit 130. FIG. 1 presents a simplified block diagram in which only the elements relevant to the invention are shown. However, the invention should not be limited to what is shown in FIG. 1.

In the embodiments of the invention, the fingerprint sensor 110 is a fingerprint sensor with a small sensing area. Namely, the sensing area of the fingerprint sensor 110 is smaller than the area of the user's finger. Therefore, when establishing the fingerprint enrollment data, in order to obtain sufficient fingerprint enrollment data for fingerprint recognition, the user needs to press his or her finger on the fingerprint sensor several times so as to generate sufficient fingerprint enrollment data for the fingerprint registration process. In an embodiment of the invention, the storage unit 130 is configured to store the fingerprint enrollment data.

In an embodiment of the invention, when the user wants to register the fingerprint to generate the fingerprint enrollment data for fingerprint recognition, the user will put his or her finger on the fingerprint sensor 110 of the electronic device 100, and then the fingerprint sensor 110 will scan the user's fingerprint to capture first input data. In addition, the processing unit 120 will divide the first input data into a plurality of first blocks which have the same area, wherein the same area means each of the first blocks includes the same number of pixels, and wherein each of the first blocks corresponds to an initial index value (initial weighting value), e.g. the initial index value is set to 1.

After the first input data is captured, the user will put his or her finger on the fingerprint sensor 110 of the electronic device 100 again, and then the fingerprint sensor 110 will scan the user's fingerprint to capture second input data, and the processing unit 120 will divide the second input data into a plurality of second blocks which have the same area, wherein the same area means each of the second blocks includes the same number of pixels, and wherein each of the second blocks corresponds to an initial index value (initial weighting value), e.g. the initial index value is set to 1. Note that the number of the first blocks of the first input data and the number of the second blocks of the second input data are the same, and the initial index value corresponding to the first blocks of the first input data and the second blocks of the second input data are also the same, e.g. the initial index value is set to 1. In addition, the area of each input data (e.g. first input data and second input data) can be the same as the sensing area of the fingerprint sensor 110.

In an embodiment of the invention, after obtaining the first input data and the second input data, the processing unit 120 will compare the first input data with the second input data to generate a comparison result. In an embodiment of the invention, the processing unit 120 may combine the first input data with the second input data, i.e. the processing unit 120 may determine the same blocks between the first input data and the second input data. In other words, parts of the first blocks of the first input data are the same as parts of the second blocks of the second input data. The processing unit 120 will accumulate the index values corresponding to the same blocks between the first input data and the second input data. Therefore, in the comparison result, the index value corresponding to each of the first blocks which are different from the second blocks is still maintained to 1; the index value (accumulation index value) corresponding to each of the first blocks which are the same as some second blocks is set to 2; and the index value corresponding to each of the second blocks which are different from the first blocks is still maintained at 1. Namely, the blocks in the area of overlapping between the first input data and the second input data have a higher index value.

In an embodiment of the invention, after obtaining the comparison result, the processing unit 120 may determine whether the area corresponding to the comparison result is bigger than a threshold. If the area corresponding to the comparison result is bigger than the threshold, the processing unit 120 will stop capturing the fingerprint data. That is to say when the area corresponding to the comparison result is bigger than the threshold, it means that the coverage of the enrollment data of the fingerprint (i.e. comparison result) is sufficient. Therefore, the processing unit 120 will indicate to the user not to put his or her finger on the fingerprint sensor 110 again to generate the enrollment data of the fingerprint. In an embodiment of the invention, the threshold can be a multiple of the sensing area of the fingerprint sensor 110, e.g. the multiple may be equal to or bigger than 2.

If the area corresponding to the comparison result is not bigger than the threshold, the processing unit 120 will generate prompting information according to the comparison result to indicate the direction and location where the user should shift and put his or her finger on the fingerprint sensor 110 to the user to generate the next input data (e.g. third input data).

Figure 2:
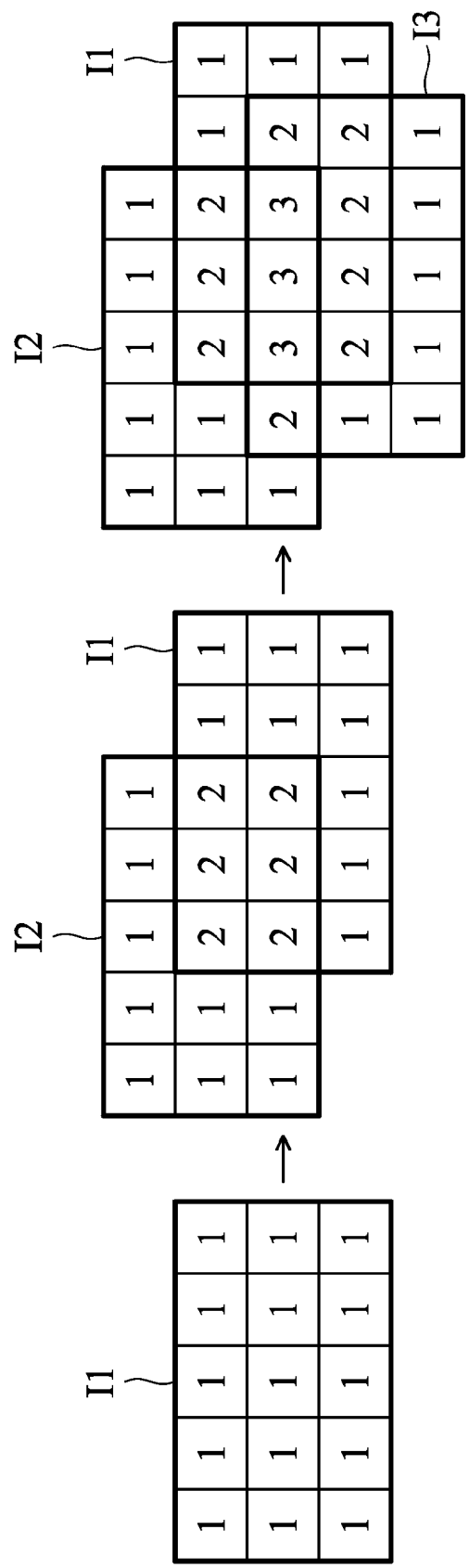
FIG. 2 is a schematic diagram illustrating the accumulation operation for the index value according to an embodiment of the invention.

For example, FIG. 2 is a schematic diagram illustrating the accumulation operation for the index value according to an embodiment of the invention. As shown in FIG. 2, the initial index value corresponding to the blocks of the first input data I1, the second input data I2 and the third input data I3 is set to 1. When the blocks of the first input data I1, the second input data I2, and the third input data I3 overlap partly, the processing unit 120 will accumulate the index values corresponding to the blocks in the overlapping area. When the index value (accumulation index value) is 2, it means that the blocks with the index value of 2 appear two times, and when the index value (accumulation index value) is 3, it means that the blocks with the index value of 3 appear three times.

After obtaining the comparison result, the processing unit 120 will generate prompting information according to the comparison result to indicate the direction and location where the user should shift and put his or her finger on the fingerprint sensor 110 to the user for capturing next input data. In an embodiment of the invention, the prompting information indicates to the user to shift his or her finger to the blocks corresponding to smaller index value (accumulation index value) in the comparison result. Because the blocks corresponding to bigger index value (accumulation index value) have a higher input frequency, i.e. the user tends to put the area of his or her finger corresponding to these blocks on the fingerprint sensor 110, and therefore the fingerprint sensor 110 may usually capture the area of fingerprint corresponding to these blocks. Therefore, the prompting information may indicate to the user to shift his or her finger to the blocks corresponding to smaller index value (accumulation index value) in the comparison result, i.e. indicate to the user to shift his or her finger to the blocks with a lower input frequency, in order to increase the coverage and completeness of the enrollment data of the fingerprint.

When the fingerprint sensor 110 captures the next input data, the user will put his or her finger on the fingerprint sensor 110 of the electronic device 100 again and shift his or her finger according to the prompting information. Then, the fingerprint sensor 110 will scan the user's fingerprint to capture a third input data. The third input data will be divided into a plurality of third blocks which have the same area, wherein each of the third blocks corresponds to an initial index value (initial weighting value), e.g. the initial index value is set to 1. After obtaining the third input data, the processing unit 120 will compare the comparison result with the third input data to generate another comparison result.

In another embodiment of the invention, the processing unit 120 determines whether to stop capturing the input data according to the number of comparison results. For example, when the processing unit 120 has generated ten comparison results, the processing unit 120 will determine the coverage of the enrollment data of the fingerprint (i.e. the area of the last comparison result) is sufficient for fingerprint recognition, and indicate to the user not to put his or her finger on the fingerprint sensor 110 to generate the enrollment data.

In an embodiment of the invention, the prompting information can be displayed on a display unit (not sown in figures). In an embodiment of the invention, the prompting information can be a schematic diagram displayed on the display unit. The user can know which blocks correspond to a higher input frequency and which blocks correspond to a lower input frequency according to the schematic diagram. Therefore, the user may shift his or her finger to the blocks corresponding to a lower input frequency. In an embodiment of the invention, the schematic diagram may be a block diagram, a ridge diagram of the fingerprint or other types of diagram. In an embodiment of the invention, the blocks corresponding to a higher input frequency are displayed in a darker color, and the blocks corresponding to a lower input frequency are displayed in a lighter color. In other words, the prompting information can indicate to the user to shift his or her finger by the colors. When the accumulation index value corresponding to a block is greater, the color corresponding to this block will be darker, and when the accumulation index value corresponding to a block is smaller, the color corresponding to this block will be lighter. Therefore, the user can shift and put his or her finger on the fingerprint sensor 110 according to the colors of the schematic diagram.

In another embodiment of the invention, the prompting information can be a text block. The processing unit 120 can indicate to the user to shift his or her finger by the content of the text block. In another embodiment of the invention, the prompting information may be an arrow (cursor) displayed on the display unit to indicate the direction where the user should shift his or her finger.

In an embodiment of the invention, the prompting information can be voice information which is generated by a voice generating unit (not shown in the figures) of the electronic device 100. The processing unit 120 can indicate to the user to shift his or her finger by the voice information.

In an embodiment of the invention, the prompting information can include one or more pieces of direction information. For example, taking FIG. 2 for example, the blocks in the upper right corner and lower left corner correspond to a lower input frequency, and therefore, the processing unit 120 will indicate to the user to shift his or her finger toward the upper right corner and lower left corner by generating the direction information simultaneously or sequentially.

Figure 3A:
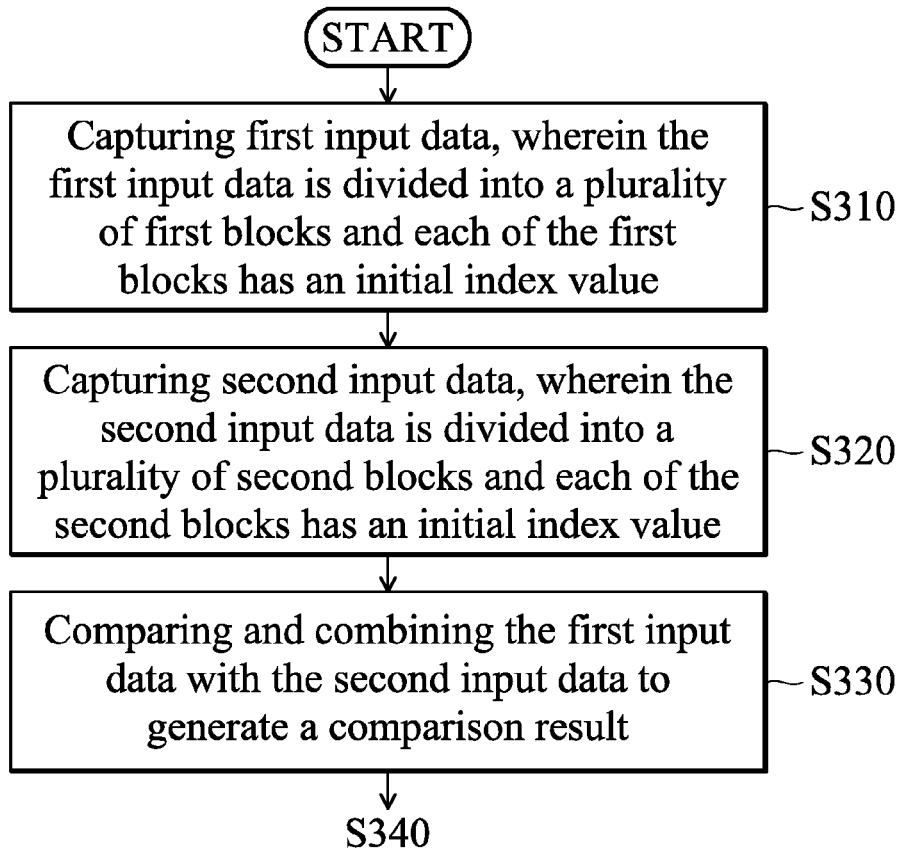
FIGS. 3A-3B is a flow chart 300 illustrating a method for generating the fingerprint enrollment data according to an embodiment of the invention.
Figure 3B:
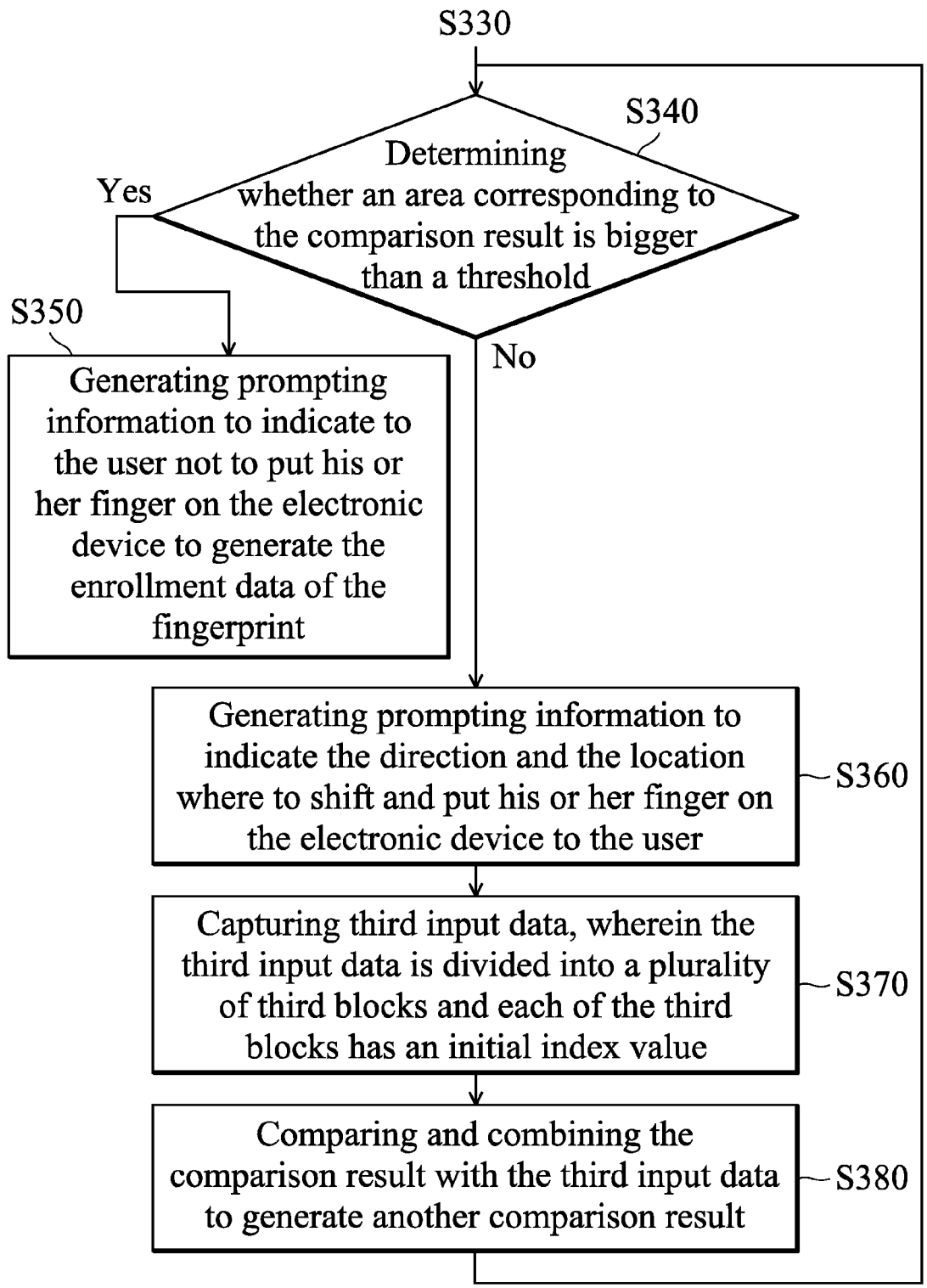

FIGS. 3A-3B is a flow chart 300 illustrating a method for generating the enrollment data of the fingerprint according to an embodiment of the invention. The method for generating the enrollment data of the fingerprint is applied to the electronic device 100. As shown in FIGS. 3A-3B, in step S310, the electronic device 100 captures first input data, wherein the first input data is divided into a plurality of first blocks and each of the first blocks has an initial index value. In step S320, the electronic device 100 captures second input data, wherein the second input data is divided into a plurality of second blocks and each of the second blocks has an initial index value. In step S330, the electronic device 100 compares and combines the first input data with the second input data to generate a comparison result. The electronic device 100 may accumulate the index values corresponding to the blocks in the area of overlapping between the first input data and the second input data. In step S340, after obtaining the comparison result, the electronic device 100 determines whether an area corresponding to the comparison result is bigger than a threshold. If the area corresponding to the comparison result is bigger than the threshold, step S350 will be performed. In step S350, the electronic device 100 generates prompting information to indicate to the user not to put his or her finger on the electronic device 100 to generate the enrollment data of the fingerprint. If the area corresponding to the comparison result is not bigger than the threshold, step S360 will be performed. In step S360, the electronic device 100 generates prompting information to indicate the direction and the location where to shift and put his or her finger on the electronic device 100 to the user. In step S370, the electronic device 100 captures third input data, wherein the third input data is divided into a plurality of third blocks and each of the third blocks has an initial index value. In step S380, the electronic device 100 compares and combines the comparison result with the third input data to generate another comparison result. After generating another comparison result, the method returns to step S340, wherein the electronic device 100 determines whether the area corresponding to this comparison result is bigger than the threshold.

In another embodiment of the invention, the electronic device 100 determines whether to stop capturing the input data according to the number of comparison results.

In the methods of the embodiments of the invention, when the user is enrolling his or her fingerprint, the user can shift his or her finger to the blocks corresponding to a smaller accumulation index value (i.e. the blocks corresponding to a lower input frequency) according to the prompting information so as to increase the coverage and completeness of the enrollment data of the fingerprint. In addition, in the methods of the embodiments of the invention, the user can establish the enrollment data of the fingerprint more efficiently by avoiding inputting the same fingerprint data repeatedly.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user's equipment. Moreover, in some aspects any suitable computer-program product may comprise a computer-readable medium comprising codes relating to one or more of the aspects of the disclosure. In some aspects, a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for generating fingerprint enrollment data, comprising:
    capturing first input data, by a fingerprint sensor, wherein the first input data is divided into a plurality of first blocks and each of the first blocks has an index value;
    capturing second input data, by the fingerprint sensor, wherein the second input data is divided into a plurality of second blocks and each of the second blocks has the index value;
    comparing and combining, by a processing unit, the first input data with the second input data to generate a comparison result;
    accumulating, by the processing unit, the index values of the first blocks and the second blocks in an area of overlapping between the first input data and second input data according to the comparison result; and
    generating, by the processing unit, prompting information according to the comparison result, wherein the prompting information indicates to a user to shift his or her finger to blocks of the first and the second blocks having a lower index value after the step of accumulating the index values.

2. The method of claim 1, further comprising:
    determining whether an area of the comparison result is bigger than a threshold, wherein when the area of the comparison result is not bigger than the threshold, the prompting information indicates location and direction where a user should put and shift his or her finger to the user; and
    capturing third input data, wherein the third input data is divided into a plurality of third blocks and each of the third blocks has the index value.

3. The method claim 2, further comprising:
    comparing and combining the comparison result with the third input data to generate another comparison result.

4. The method of claim 1, further comprising:
    determining whether an area of the comparison result is bigger than a threshold; and
    indicating to a user not to input fingerprint data by the prompting information when the area of the comparison result is bigger than the threshold.

5. The method of claim 1, further comprising:
    determining whether to stop capturing fingerprint data according to the number of comparison results.

6. The method of claim 1, wherein the prompting information is displayed on a display unit and the prompting information includes one or plurality of pieces of direction information.

7. The method of claim 1, wherein the prompting information is generated by a voice generating unit.

8. The method of claim 1, wherein the prompting information indicates to the user to shift his or her finger by displaying different colors.

9. An electronic device, comprising:
    a fingerprint sensor, configured to capture first input data, wherein the first input data is divided into a plurality of first blocks and each of the first blocks has an index value and captures second input data, wherein the second input data is divided into a plurality of second blocks and each of the second blocks has the index value; and
    a processing unit, configured to compare and combine the first input data with the second input data to generate a comparison result, and generate prompting information according to the comparison result, wherein when generating a comparison result, the processing unit accumulates the index values of the first blocks and the second blocks in an area of overlapping between the first input data and second input data, wherein the prompting information indicates to a user to shift his or her finger to blocks of the first and the second blocks having a lower index value after the processing unit has accumulated the index values.

10. The electronic device of claim 9, wherein the processing unit determines whether an area of the comparison result is bigger than a threshold, wherein when the area of the comparison result is not bigger than the threshold, the prompting information indicates location and direction where a user should put and shift his or her finger to the user, and the processing unit captures third input data, wherein the third input data is divided into a plurality of third blocks and each of the third blocks has the index value.

11. The electronic device of claim 10, wherein the processing unit compares and combines the comparison result with the third input data to generate another comparison result.

12. The electronic device of claim 9, wherein the processing unit determines whether an area of the comparison result is bigger than a threshold, wherein when the area of the comparison result is bigger than the threshold, the prompting information indicates to a user not to input fingerprint data.

13. The electronic device of claim 9, wherein the processing unit determines whether to stop capturing fingerprint data according to the number of comparison results.

14. The electronic device of claim 9, further comprising:
    a display unit, configured to display the prompting information, wherein the prompting information includes one or plurality of pieces of direction information.

15. The electronic device of claim 9, further comprising:
    a voice generating unit, configured to generate the prompting information.

16. The electronic device of claim 9, wherein the prompting information indicates to the user to shift his or her finger by displaying different colors.

* * * * *